(12) United States Patent
Carignan et al.

(10) Patent No.: US 8,372,534 B2
(45) Date of Patent: Feb. 12, 2013

(54) CONNECTOR FOR BATTERY PACK

(75) Inventors: Claude Carignan, Varennes (CA);
Pierre Leverone, Blainville (CA); Alain Vallee, Varennes (CA); Shu-Fu Yeh, Brossard (CA); Guy Gilbert, Boucherville (CA)

(73) Assignee: Bathium Canada Inc., Boucherville (CA)

( * ) Notice: Subject to any disclaimer, the term of this patent is extended or adjusted under 35 U.S.C. 154(b) by 342 days.

(21) Appl. No.: 12/874,793

(22) Filed: Sep. 2, 2010

(65) Prior Publication Data

US 2012/0058381 A1    Mar. 8, 2012

(51) Int. Cl.
*H01M 2/24* (2006.01)
*H01M 2/02* (2006.01)
*H01R 4/30* (2006.01)

(52) U.S. Cl. ......... 429/158; 429/160; 429/178; 439/755

(58) Field of Classification Search .................... 429/96, 429/99–100, 158, 160, 177–178; 439/500, 439/504, 522, 627, 754, 755
See application file for complete search history.

(56) References Cited

U.S. PATENT DOCUMENTS 5,576,516 A * 11/1996 Kameyama et al. ....... 174/138 F
8,038,487 B2 * 10/2011 Tsuchiya et al. ............. 439/765

\* cited by examiner

*Primary Examiner* — Ula C. Ruddock
*Assistant Examiner* — Thomas H. Parsons
(74) *Attorney, Agent, or Firm* — McMillan LLP

(57) ABSTRACT

A battery pack having battery connectors for connecting batteries in series and a battery connector are disclosed that reduce the risks of potential electric shocks during assembly and servicing of a battery pack.

5 Claims, 4 Drawing Sheets

CONNECTOR FOR BATTERY PACK

FIELD OF THE INVENTION

The present invention relates to a device for connecting batteries and more specifically to a device for connecting high voltage batteries.

BACKGROUND OF THE INVENTION

Battery packs for electric vehicle include multiple high voltage batteries typically connected in series via high gauge wire connecting the positive and negative poles of the batteries. The total voltage of a battery pack in an electric vehicle can reach up to 400 volts when all batteries are connected together.

A battery pack is typically assembled manually by technicians connecting all the batteries together in series with high gauge wires. The total voltage of the battery pack increases with each new battery being connected. As the total voltage of the battery pack increases, the risk of electric shocks for the technicians connecting the batteries together also increases since they are essentially in contact with the battery poles through the tools they use and the manipulation of the high gauge wires. Care must be used when connecting the poles of the batteries to avoid direct contact with the power source since at these high voltages, high currents may circulate which may temporarily incapacitate the technician who may be unable to quickly disengage himself from the direct contact. For this reason, it has become standard practice in the industry to have a second technician monitoring the assembly of a battery pack ready to intervene in case of direct contact with the battery poles.

For the same reasons, care must be used by the competent technician when servicing a battery pack and even more so for the non-initiated who improvises himself as a technician unaware of the risks. High voltage battery packs are preferably sealed to avoid any manipulation of the batteries by untrained labour.

Therefore, there is a need for a device for connecting high voltage batteries that reduces the risks of potential electric shocks during assembly and servicing of a high voltage battery pack.

SUMMARY OF THE INVENTION

It is an object of the present invention to ameliorate at least some of the inconveniences present in the prior art.

It is also an object of the present invention to provide a battery connector for connecting high voltage batteries that reduces or eliminates the risks of potential electric shocks during assembly and servicing of a high voltage battery pack.

In one aspect, the invention provides a battery pack having multiple batteries connected in series by battery connectors, each battery connector comprising: a pair of battery pole covers made of an electrically insulating material mounted onto battery poles of two adjacent batteries, each battery pole cover having a receptacle area providing access to the battery poles and an aperture; a connecting bridge made of an electrically conductive material inserted into the receptacle area of the pole covers for electrically connecting the two adjacent batteries, the connecting bridge having a central portion covered with electrically insulating material; and a pair of fasteners for securing the connecting bridge to the poles of adjacent batteries, each fastener being positioned inside one of the pair of battery pole covers, each fastener including a threaded portion made of metal and an electrically insulated portion made of a non-conductive material, the electrically insulated portion of the fasteners being accessible through the apertures of the battery pole covers for fastening the fasteners onto the battery poles.

In a further aspect, the invention provides a battery connector for connecting a plurality of batteries in series to form a battery pack, the battery connector comprising: a pair of battery pole covers made of an electrically insulating material for mounting onto battery poles of two adjacent batteries, each battery pole cover having a receptacle area for providing access to the battery poles and an aperture; a connecting bridge made of an electrically conductive material for insertion into the receptacle area of the pole covers for electrically connecting two adjacent batteries, the connecting bridge having a central portion covered with electrically insulating material; and a pair of fasteners for securing the connecting bridge to the poles of adjacent batteries, each fastener being positioned inside one of the pair of battery pole covers, each fastener including a threaded portion made of metal and an electrically insulated portion made of a non-conductive material, the electrically insulated portion of the fasteners being accessible through the apertures of the battery pole covers.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
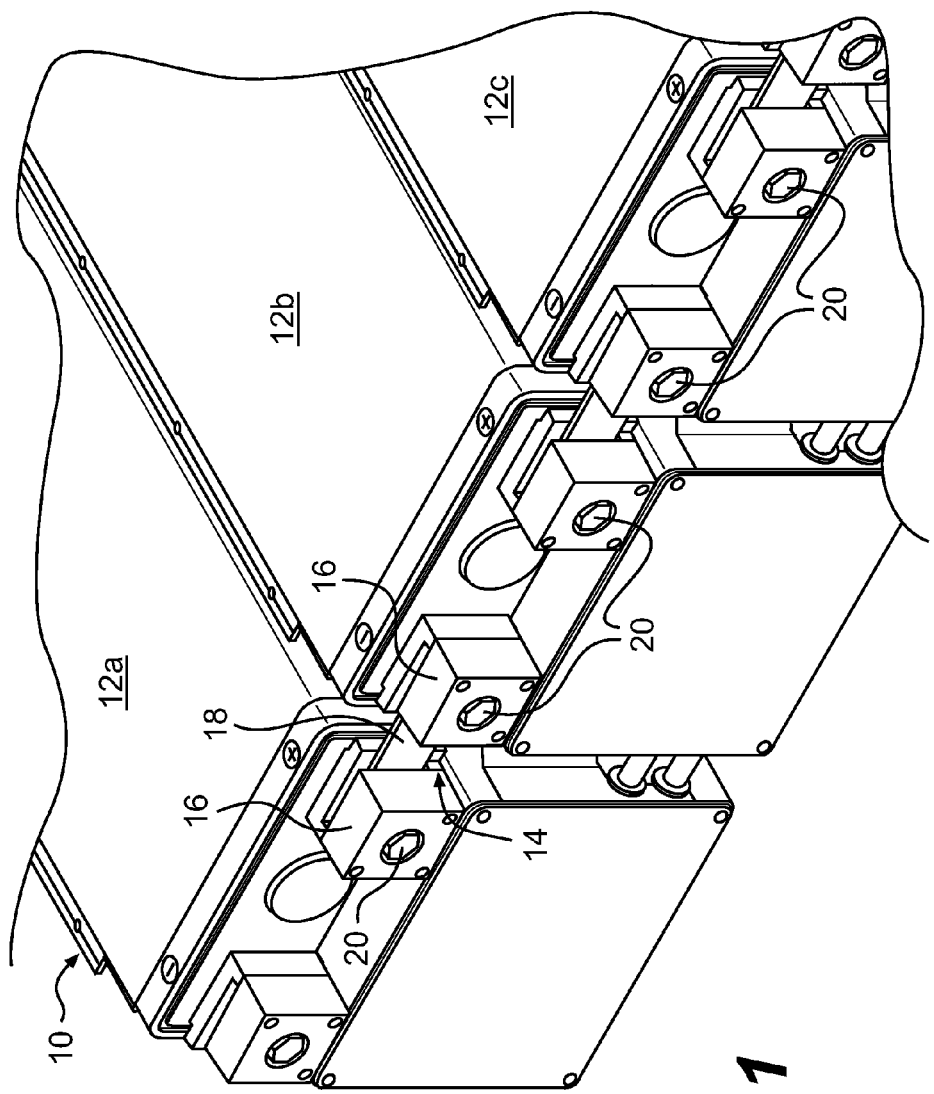
FIG. 1 is a downward front perspective view of a portion of an automotive battery pack connected in series with battery connectors in accordance with an embodiment of the invention.

With reference to FIG. 1, there is shown a portion of an automotive battery pack 10 including a plurality of batteries 12a, 12b, 12c . . . connected in series via battery connectors 14. In FIG. 1, the positive pole of battery 12a is connected to the negative pole of battery 12b, and the positive pole of battery 12b is connected to the negative pole of battery 12c. Each battery connectors 14 includes battery pole covers 16 made of an electrically insulating plastic, a connecting bridge 18 made of an electrically conductive metal such as copper, and a pair of fasteners 20 adapted to press the extremities of the bridge 18 against the positive or negative poles of adjacent batteries.

Figure 2:
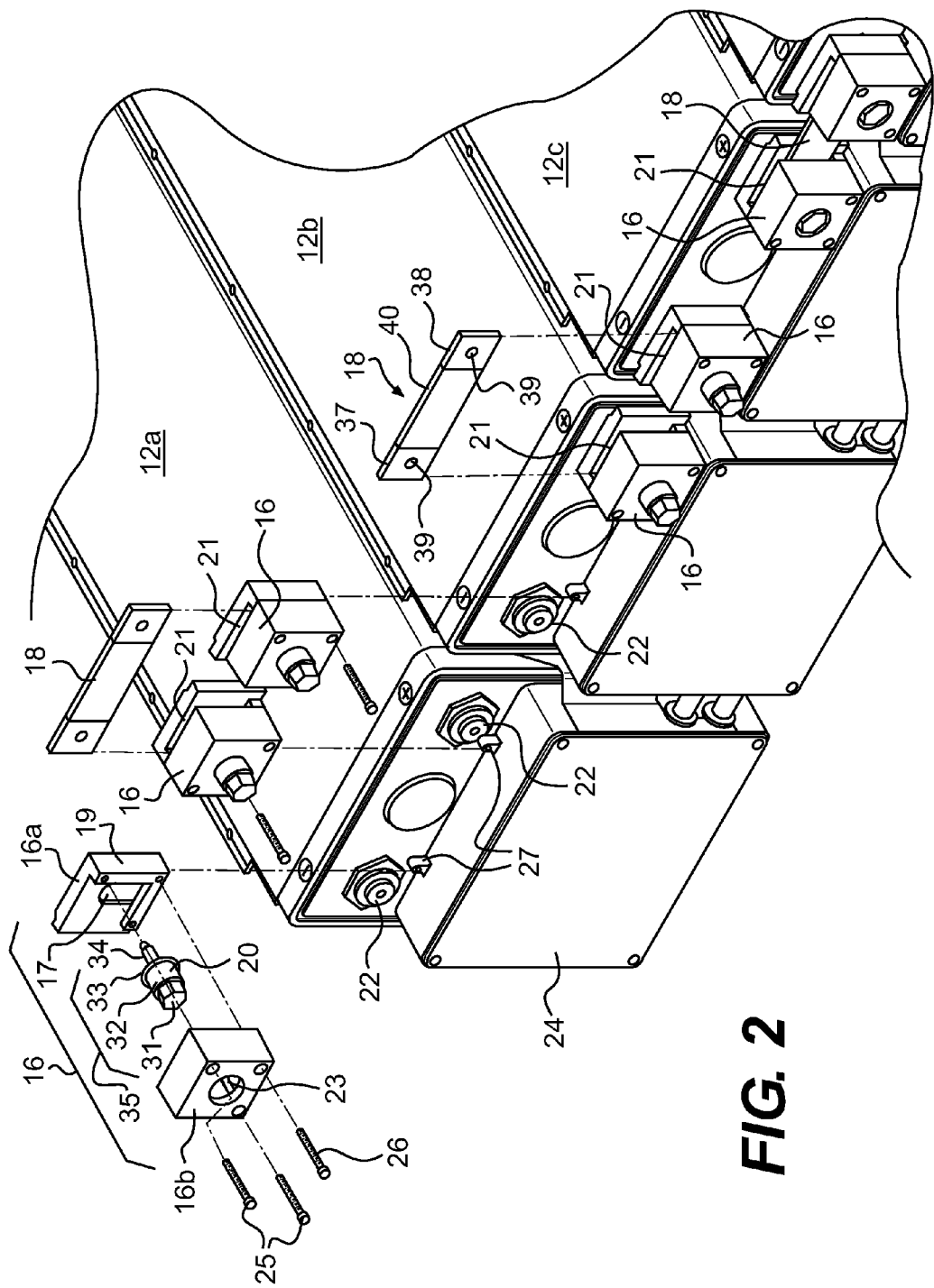
FIG. 2 is a downward front perspective view of the battery pack shown in FIG. 1 with the battery connectors shown in exploded view.

With reference to FIG. 2, there is shown the same portion of the automotive battery pack 10 with the battery connectors 14 in various stages of assembly. The battery pole cover 16 of the negative pole 22 of the battery 12a is shown in fully exploded view. The pole cover 16 includes a first portion 16a having an aperture 17 which is adapted to snap onto the protruding portion of the pole 22.

The first portion 16a also features an L-shaped ridge 19 defining the receptacle area 21 into which the bridge 18 is received when the batteries are connected. The pole cover 16 includes a second portion 16b which is fastened to the first portion 16a via screws 25. When assembled, the first and second portion 16a and 16b define the receptacle areas 21 of the battery connector 14. The second portion 16b includes an aperture 23 for receiving the fastener 20. The aperture 23 has a specific diameter corresponding to the diameter of a circular middle portion 32 of the fastener 20. The fastener 20 includes a threaded portion 34 made of metal and an electrically insulating portion 35 made of a non-conductive material. The electrically insulating portion 35 includes a head portion 31, the circular middle portion 32 and a ridge stopper 33. As previously mentioned, the aperture 23 of the second portion 16b has a specific diameter corresponding to the diameter of the middle portion 32 such that when the first and second portion 16a and 16b of the pole cover 16 are assembled, the fastener 20 is trapped inside by the ridge stopper 33. The metallic threaded portion 34 of the fastener 20 is isolated by the electrically insulating portion 35 such that when a technician is tightening the fastener 20 onto the battery pole 22, there is no danger of electric shock. Furthermore, the technician is prevented from touching the metallic threaded portion 34 of the fastener 20 because it is trapped inside the pole cover 16. The electrically insulating portion 35 is connected onto the metallic threaded portion 34 of the fastener 20 in such a way that it will break if the torque applied onto it is excessive thereby preventing the metallic threaded portion 34 from breaking or stripping its threads or the threads of the battery poles 22.

The actual connecting component of the battery connectors 14 is the connecting bridge 18. As previously mentioned, connecting bridge 18 is made of an electrically conductive metal such as copper. As shown in FIG. 2, connecting bridge 18 consists of an elongated rectangular piece of conductive metal wherein the extremities 37 and 38 each include an aperture 39 for receiving the threaded portion 34 of the fasteners 20. The central portion 40 of the connecting bridge 18 is covered with an electrically insulating material such as a rubber coating to prevent direct contact between the hand of the technician and the conductive metal of the connecting bridge 18. The extremities 37 and 38 are not covered with an insulating material such that the conductive metal may directly contact the positive or negative poles 22 when the connecting bridge 18 is installed to electrically connect two adjacent batteries 12a, 12b, 12c . . .

The pole covers 16 may be mounted onto the battery poles 22 in two different ways. The pole covers 16 may either be completely assembled prior to them being mounted onto the battery poles 22 or the pole covers 16 may be assembled onto the battery poles 22.

In the first instance, the first and second portions 16a and 16b are assembled together with the screws 25 with the fastener 20 trapped inside the pole cover 16, the entire assembly is positioned onto the battery pole 22 via the aperture 17 of the first portion 16a and then the screw 26 is screwed into a threaded protrusion 27 located on the battery front plate 24 adjacent to the battery pole 22.

Alternatively, the first portion 16a may be initially positioned onto the battery pole 22 via its aperture 17, the fastener 20 is engaged into the battery pole 22, the second portion 16b is assembled onto the first portion 16a via the screws 25 and the pole cover 16 is secured to the battery 12 via screw 26 being screwed into a threaded protrusion 27 adjacent to the battery pole 22. Thereafter, the fastener 20 is disengaged from the battery pole 22 to allow insertion of the connecting bridge 18.

Figure 3:
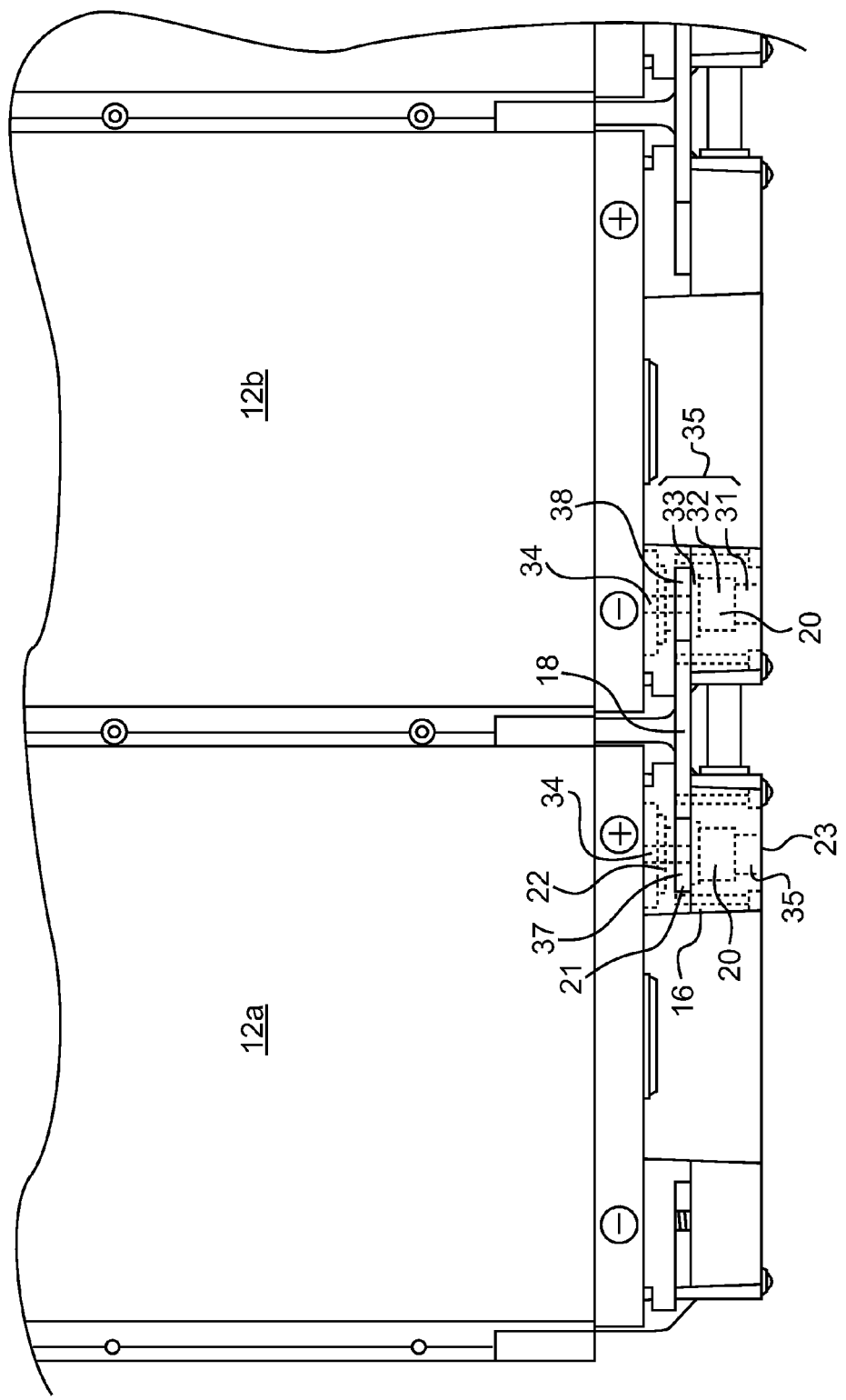
FIG. 3 is a top plan view of the battery pack shown in FIG. 1.
Figure 4:
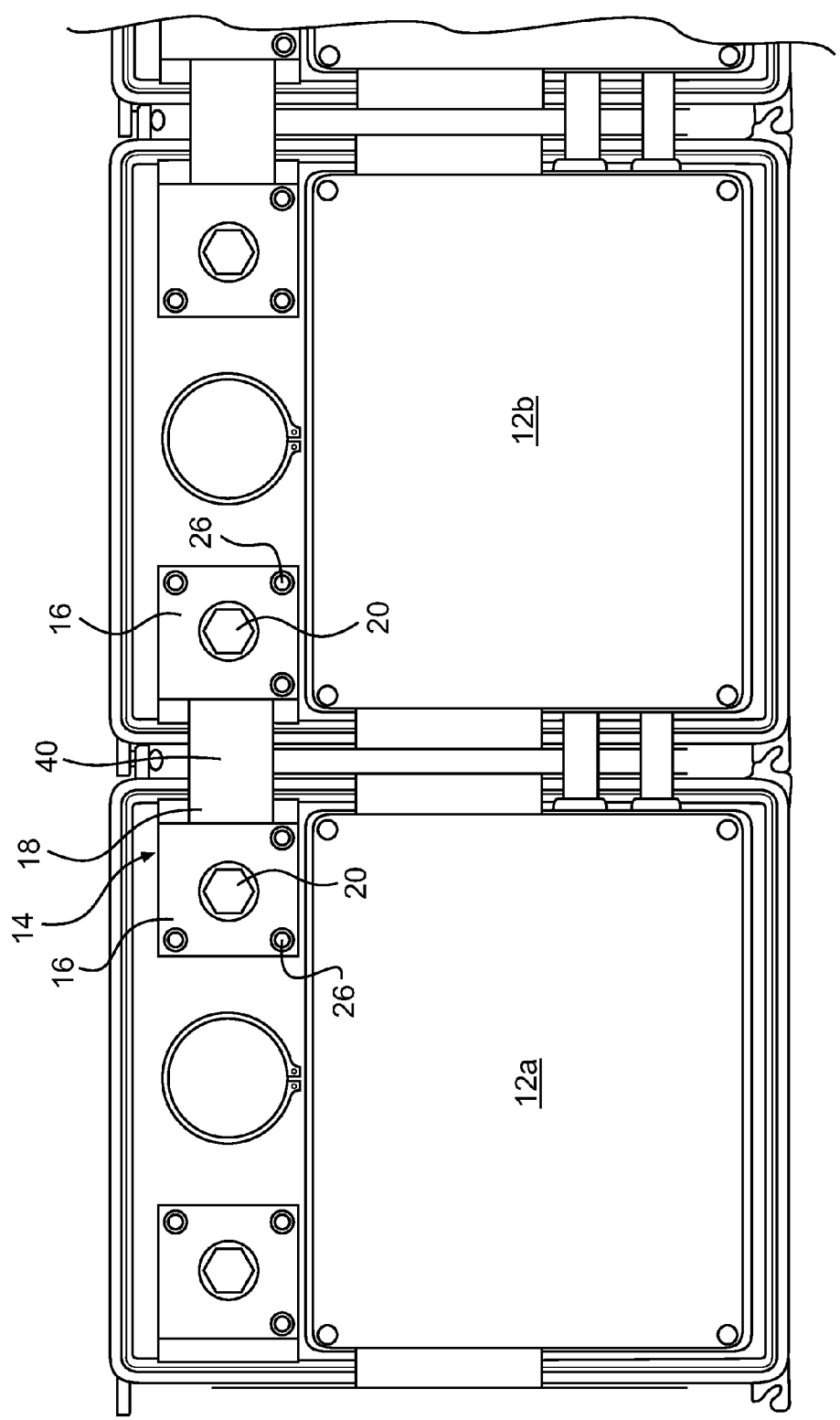
FIG. 4 is a front elevation view of the battery pack shown in FIG. 1.

With reference to FIG. 3, the pole covers 16 are installed onto the poles 22 of the batteries 12a, 12b and 12c and the bridge 18 is inserted into the receptacle areas 21 of the pole cover 16 of the adjacent batteries thereby electrically connecting the positive pole 22 of one battery to the negative pole 22 of the adjacent battery. The electrically insulating portions 35 of the fasteners 20 are accessible via the aperture 23 of the pole covers 16. The threaded portion 34 of the fasteners 20 are screwed into the battery poles 22 and tightened thereby pressing the extremities 37 and 38 of the bridge 18 onto the poles 22 and ensuring an effective electrical connection between adjacent batteries. As can be seen in FIGS. 3 and 4, the central portion 40 of the connecting bridge 18 which is covered with electrically insulating material such as a rubber coating is the only portion of the connecting bridge 18 that remains exposed once the connecting bridge 18 is installed into the pole covers 16 thereby preventing any direct contact between the hand of the technician and the conductive metal of the connecting bridge 18.

The electrical connection between two adjacent batteries is therefore electrically isolated from direct contact such that the battery pack 10 is secured from potential electric shock.

During the assembly of a battery pack 10 comprising multiple batteries connected in series, the total voltage of the battery pack 10 increases with each new battery being connected. As the total voltage of the battery pack increases with each new battery being added to the battery pack, the risk of electric shocks for the technician connecting the batteries together previously described is significantly reduced if not completely eliminated by the use of battery connectors 14 since the battery connectors 14 isolate the technician from the high voltage batteries at each step of the assembly. At no time is the technician exposed to direct contact with an electrically conducting element of the battery pack 10 rendering the battery pack 10 as well as its assembly safe and secure.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A battery pack having multiple batteries connected in series by battery connectors, each battery connector comprising:

a pair of battery pole covers made of an electrically insulating material mounted onto battery poles of two adjacent batteries, each battery pole cover having a receptacle area providing access to the battery poles and an aperture;

a connecting bridge made of an electrically conductive material inserted into the receptacle area of the pole covers for electrically connecting the two adjacent batteries, the connecting bridge having a central portion covered with electrically insulating material; and a pair of fasteners for securing the connecting bridge to the poles of adjacent batteries, each fastener being positioned inside one of the pair of battery pole covers, each fastener including a threaded portion made of metal and an electrically insulated portion made of a non-conductive material, the electrically insulated portion of the fasteners being accessible through the apertures of the battery pole covers for fastening the fasteners onto the battery poles.

2. A battery pack as defined in claim 1, wherein each battery pole cover includes a first portion adapted for mounting onto the battery pole and a second portion assembled onto the first portion to define the receptacle area, the second portion having the aperture for accessing the fastener.

3. A battery pack as defined in claim 1, wherein each battery pole cover is made of an electrically insulating plastic.

4. A battery pack as defined in claim 1, wherein the central portion of the connecting bridge is covered with a rubber material.

5. A battery connector for connecting a plurality of batteries in series to form a battery pack, the battery connector comprising:

a pair of battery pole covers made of an electrically insulating material for mounting onto battery poles of two adjacent batteries, each battery pole cover having a receptacle area for providing access to the battery poles and an aperture;

a connecting bridge made of an electrically conductive material for insertion into the receptacle area of the pole covers for electrically connecting two adjacent batteries, the connecting bridge having a central portion covered with electrically insulating material; and a pair of fasteners for securing the connecting bridge to the poles of adjacent batteries, each fastener being positioned inside one of the pair of battery pole covers, each fastener including a threaded portion made of metal and an electrically insulated portion made of a non-conductive material, the electrically insulated portion of the fasteners being accessible through the apertures of the battery pole covers.

* * * * *